3,178,458
PROCESS OF PREPARING 4-HYDROXY-3-KETO-Δ⁴-STEROIDS
Bruno Camerino, Milan, Bianca Patelli, Stradella, Pavia, and Roberto Sciaky, Milan, Italy, assignors to Società Farmaceutici Italia, Milan, Italy, an Italian corporation
No Drawing. Filed Feb. 8, 1963, Ser. No. 257,077
Claims priority, application Italy, Feb. 13, 1962, 2,814/62
5 Claims. (Cl. 260—397.4)

Our invention relates to an improved process of obtaining 4-hydroxy-3-keto-$\Delta^4$-steroids of the androstane and 19-nor-androstane series.

In our Patent No. 3,068,247 of December 11, 1962 we describe and claim a process to obtain 4-hydroxy-3-keto-$\Delta^4$-steroids (III) of the normal and 19-nor-series from the corresponding 4-chloro-derivatives (I) by reaction with oxygen in the presence of the potassium salt of a tertiary aliphatic alcohol, such as potassium t.butylate, and by subsequent catalytic hydrogenation of the resulting 4-hydroxy-3-keto-$\Delta^{4,6}$-steroids (II).

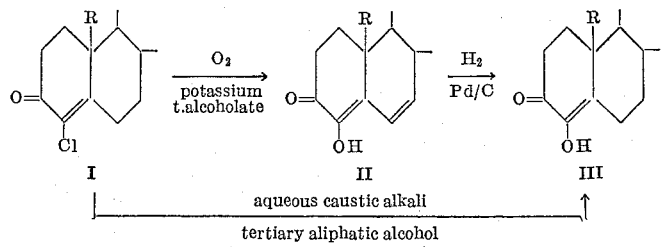

wherein R=H or $CH_3$.

We have now found that 4-chloro-3-keto-$\Delta^4$-androstenes (I) of the normal and 19-nor series, upon reaction with an alkaline hydroxide dissolved in a tertiary aliphatic alcohol in an inert gas atmosphere directly yields the corresponding 4-hydroxy-3-keto-$\Delta^4$-androstenes (II).

According to our present invention, 4-chloro-3-keto-$\Delta^4$-steroids of the androstane and 19-nor-androstane series (prepared according to Camerino et al. Belgian Patents 549,701 and 557,735 and Camerino U.S. Patents 2,953,-582 and 3,025,310) are dissolved in a tertiary aliphatic alcohol, such as tertiary butyl alcohol or tertiary amyl alcohol, and reacted with an excess of aqueous alkaline hydroxide, such as sodium or potassium hydroxide, in an inert gas atmosphere, such as nitrogen, in the warm, preferably at the boiling point temperature of the alcohol used, over a period of time from a few minutes to several hours. When the treatment is over, the reaction mixture is neutralized with an acid, such as acetic acid or a dilute mineral acid and then diluted with water. The steroid is then isolated, preferably by extraction with a water-immiscible organic solvent.

The resulting crude products, i.e. 4-hydroxy-3-keto-$\Delta^4$-androstenes of the normal and 19-nor series may be purified either by crystallization from an organic solvent or by chromatography on sorbents such as Florisil (an activated magnesium silicate) and subsequent elution and crystallization. They may be transformed into their acylates by acylation of the secondary hydroxyl groups present therein with the chloride or anhydride of an organic acid, in the optional presence of tertiary amines and the subsequent purification according to the usual procedures.

4-hydroxy-3-keto-$\Delta^4$-steroids of the androstane and 19-nor-androstane series are therapeutically useful as anabolic and androgenic products.

The following examples serve to illustrate, but are not intended to limit, the present invention.

*Example 1.—4-hydroxy-testosterone*

0.500 g. of 4-chloro-testosterone acetate in 40 cm.³ of t.butanol (or t.amyl alcohol) were refluxed for 15 minutes in nitrogen atmosphere. A solution of 0.500 g. of potassium hydroxide (or sodium hydroxide) in 10 cm.³ of water was then added. One hour after the addition, the solution was neutralized with acetic acid and extracted with ethyl acetate. The organic extract was washed with 5% aqueous sodium hydroxide and then with water to neutrality and the solvent was evaporated in vacuo. The residue, which presents a $\lambda_{max}$ at 280 m$\mu$ with $\epsilon=7,000$ was chromatographed on Florisil. The fractions after being eluted with benzene-ethyl ether 1:1 by volume mixtures, yielded 4-hydroxy-testosterone upon recrystallization by addition of ethyl ether; M.P.=221–223° C.

*Example 2.—4-hydroxy-17α-methyl-testosterone*

Operating as in Example 1, using 0.500 g. of 4-chloro-17α-methyl-testosterone, we obtained 4-hydroxy-17α-methyl-testosterone; M.P.=170–172° C.

*Example 3.—4-hydroxy-19-nor-testosterone*

Operating as in Example 1, using 1.5 g. of 4-chloro-19-nor-testosterone acetate, we obtained 4-hydroxy-19-nor-testosterone (M.P.=188–190° C.).

*Example 4.—4-hydroxy-17α-methyl-19-nor-testosterone*

Operating as in Example 1, we obtained from 1.5 g. of 4-chloro-17α-methyl-19-nor-testosterone, 4-hydroxy-17α-methyl-19-nor-testosterone (M.P.=168–170° C.).

*Example 5.—4,11β-dihydroxy-testosterone*

Operating as in Example 1, we obtained from 1.5 g. of 4-chloro-11β-hydroxy-testosterone, 4,11β-dihydroxy-testosterone (M.P.=210–212° C.).

*Example 6.—4,11β-dihydroxy-17α-methyl-testosterone*

Operating as in Example 1, we obtained from 1.5 g. of 4-chloro-11β-hydroxy-17α-methyl-testosterone, 4,11β-dihydroxy-17α-methyl-testosterone (M.P.=183–185° C.).

We claim:

1. A process of preparing a compound selected from the group consisting of 4-hydroxy-3-keto-$\Delta^4$-steroids of the androstane series, which comprises reacting the corresponding 4-chloro-3-keto-$\Delta^4$-steroid, dissolved in a saturated hydrocarbon aliphatic tertiary alcohol with up to five carbon atoms, with an aqueous alkaline hydroxide while maintaining the reaction mixture in a nitrogen atmosphere and a warm temperature, to yield directly the 4-hydroxy-3-keto-$\Delta^4$-steroid.

2. A process of preparing 4-hydroxy-testosterone, which comprises reacting 4-chloro-testosterone acetate, dissolved in a saturated hydrocarbon aliphatic tertiary alcohol with up to five carbon atoms, with an aqueous alkaline hydroxide, while maintaining the reaction mixture in a nitrogen atmosphere, and at the boiling point of said tertiary aliphatic alcohol, to yield directly 4-hydroxy-testosterone.

3. A process of preparing 4-hydroxy-17α-methyl-testosterone, which comprises reacting 4-chloro-17α-methyl-testosterone, dissolved in a saturated hydrocarbon aliphatic tertiary alcohol with up to five carbon atoms, with an aqueous alkaline hydroxide, while maintaining the reaction mixture in a nitrogen atmosphere and at the boiling point of said tertiary aliphatic alcohol, to yield directly 4-hydroxy-17α-methyl-testosterone.

4. A process of preparing 4,11β-dihydroxy-testosterone, which comprises reacting 4-chloro-11β-hydroxytestosterone, dissolved in a saturated hydrocarbon aliphatic tertiary alcohol with up to five carbon atoms, with an aqueous alkaline hydroxide, while maintaining the reaction mixture in a nitrogen atmosphere, and at the boiling point of said tertiary aliphatic alcohol, to yield directly 4,11β-dihydroxy-testosterone.

5. A process of preparing 4,11β-dihydroxy-17α-methyl-testosterone, which comprises reacting 4-chloro-11β-hydroxy-17α-methyl-testosterone, dissolved in a saturated hydrocarbon aliphatic tertiary alcohol with up to five carbon atoms, with an aqueous alkaline hydroxide, while maintaining the reaction mixture in a nitrogen atmosphere, and at the boiling point of said tertiary aliphatic alcohol, to yield directly 4,11β-dihydroxy-17α-methyl-testosterone.

References Cited by the Examiner
UNITED STATES PATENTS 3,068,247 12/62 Camerino et al. _____ 260—397.4

OTHER REFERENCES

Latimer et al.: Reference Book of Inorganic Chemistry, published by the MacMillan Company (1940), New York, page 13.

LEWIS GOTTS, *Primary Examiner.*